(12) United States Patent
Bizzarri

(10) Patent No.: US 10,135,617 B2
(45) Date of Patent: Nov. 20, 2018

(54) DEVICE AND METHOD FOR MANAGING ELECTRONIC FACILITIES OF BUILDINGS

(71) Applicant: Bentel Security S.r.l., Teramo (IT)

(72) Inventor: Pier Giuseppe Bizzarri, San Benedetto del Tronto (IT)

(73) Assignee: BENTEL SECURITY S.R.L., Teramo (IT)

( * ) Notice: Subject to any disclaimer, the term of this patent is extended or adjusted under 35 U.S.C. 154(b) by 0 days.

(21) Appl. No.: 14/377,710

(22) PCT Filed: Jan. 28, 2013

(86) PCT No.: PCT/IB2013/050718
§ 371 (c)(1),
(2) Date: Aug. 8, 2014

(87) PCT Pub. No.: WO2013/118018
PCT Pub. Date: Aug. 15, 2013

(65) Prior Publication Data
US 2015/0016603 A1 Jan. 15, 2015

(30) Foreign Application Priority Data
Feb. 9, 2012 (IT) ................ VI2012A0034

(51) Int. Cl.
*H04L 9/14* (2006.01)
*G05B 15/02* (2006.01)
*G05B 19/042* (2006.01)

(52) U.S. Cl.
CPC ............. *H04L 9/14* (2013.01); *G05B 15/02* (2013.01); *G05B 19/0426* (2013.01); *H04L 2209/12* (2013.01)

(58) Field of Classification Search
CPC ......... H04L 9/14; H04L 2209/12; G05B 15/02; G05B 19/0426; G06F 11/1433;
(Continued)

(56) References Cited

U.S. PATENT DOCUMENTS 4,788,647 A * 11/1988 McManus ............... F01K 13/02
340/3.7
5,586,304 A * 12/1996 Stupek, Jr. ............... G06F 8/68
707/999.201
(Continued)

FOREIGN PATENT DOCUMENTS

WO WO93/20538 * 10/1993 ........... G06K 19/073
WO 2008/054058 A1 5/2008

OTHER PUBLICATIONS

International Search and Written Opinion dated Apr. 26, 2013 of PCT/IB2013/050718 filed Jan. 28, 2013.

*Primary Examiner* — Catherine B Thiaw

(57) ABSTRACT

A device and a method for managing electronic facilities of buildings. The device may include one or more interface elements for connecting the device to one or more electronic facilities of a building, a connection element for the connection of a portable storage device, and a control unit for reading files from the portable storage device, in which the reading of the files from the portable storage device is based on cryptography techniques, and in which the control unit is adapted to operate the electronic facilities by means of the interface elements on the basis of the result of the reading of the files from the portable storage device. The device according to the present disclosure enables a user to manage various types of electronic facilities of buildings simultaneously in a simple manner and by using a single portable storage device.

17 Claims, 1 Drawing Sheet

(58) Field of Classification Search
CPC ...... G06F 8/65; G06F 13/385; G06F 19/3406; G06F 21/6209; G06F 21/10; G06F 21/72; G06F 2221/2153; G06F 21/123; G06F 21/77

See application file for complete search history.

(56) References Cited

U.S. PATENT DOCUMENTS

| | | | | |
|---|---|---|---|---|
| 6,202,207 | B1* | 3/2001 | Donohue | G06F 8/65 705/59 |
| 6,438,749 | B1* | 8/2002 | Chamberlain | G06F 8/62 714/15 |
| 6,912,711 | B1* | 6/2005 | Curtis | G06F 8/65 709/203 |
| 7,702,984 | B1* | 4/2010 | Lee | G06F 12/1416 365/185.33 |
| 7,770,165 | B2* | 8/2010 | Olson | G06F 8/68 709/203 |
| 7,934,210 | B1* | 4/2011 | Stampfli | G06F 8/61 709/220 |
| 8,473,941 | B2* | 6/2013 | Tsvi | G06F 3/0607 717/174 |
| 8,745,601 | B1* | 6/2014 | Carlson | G06F 8/61 717/134 |
| 2002/0120856 | A1 | 8/2002 | Schmidt et al. | |
| 2003/0191955 | A1 | 10/2003 | Wagner et al. | |
| 2004/0003262 | A1* | 1/2004 | England | G06F 21/606 713/189 |
| 2004/0034850 | A1* | 2/2004 | Burkhardt | G06F 8/65 717/120 |
| 2004/0068330 | A1* | 4/2004 | White | G05B 19/0426 700/18 |
| 2005/0097618 | A1* | 5/2005 | Arling | H04L 12/2805 725/114 |
| 2005/0193389 | A1* | 9/2005 | Murphy | G06F 8/61 717/175 |
| 2008/0094171 | A1* | 4/2008 | Sawhney | G07C 9/00103 340/5.6 |
| 2008/0178295 | A1* | 7/2008 | Szeles | G06F 21/10 726/26 |
| 2008/0301158 | A1* | 12/2008 | Brown | G06Q 50/22 |
| 2010/0298984 | A1* | 11/2010 | Mauk | H01R 13/6456 700/276 |
| 2011/0015797 | A1* | 1/2011 | Gilstrap | G05B 15/02 700/291 |
| 2011/0169924 | A1* | 7/2011 | Haisty | H04N 9/3147 348/51 |
| 2011/0173599 | A1* | 7/2011 | Ohama | G06F 8/65 717/168 |
| 2011/0257973 | A1* | 10/2011 | Chutorash | G01C 21/3661 704/235 |
| 2012/0005465 | A1* | 1/2012 | Attanasio | G06F 9/44505 713/1 |
| 2012/0191657 | A1* | 7/2012 | Weinstein | H04L 67/1095 707/654 |
| 2012/0221149 | A1* | 8/2012 | Kasper | G05B 15/02 700/276 |
| 2012/0226368 | A1* | 9/2012 | Thomson | G05B 19/0426 700/87 |
| 2013/0067449 | A1* | 3/2013 | Sannidhanam | G06F 8/60 717/170 |
| 2013/0146663 | A1* | 6/2013 | Hart | H04L 9/006 235/439 |
| 2014/0040877 | A1* | 2/2014 | Goldman | G06F 8/61 717/174 |

* cited by examiner

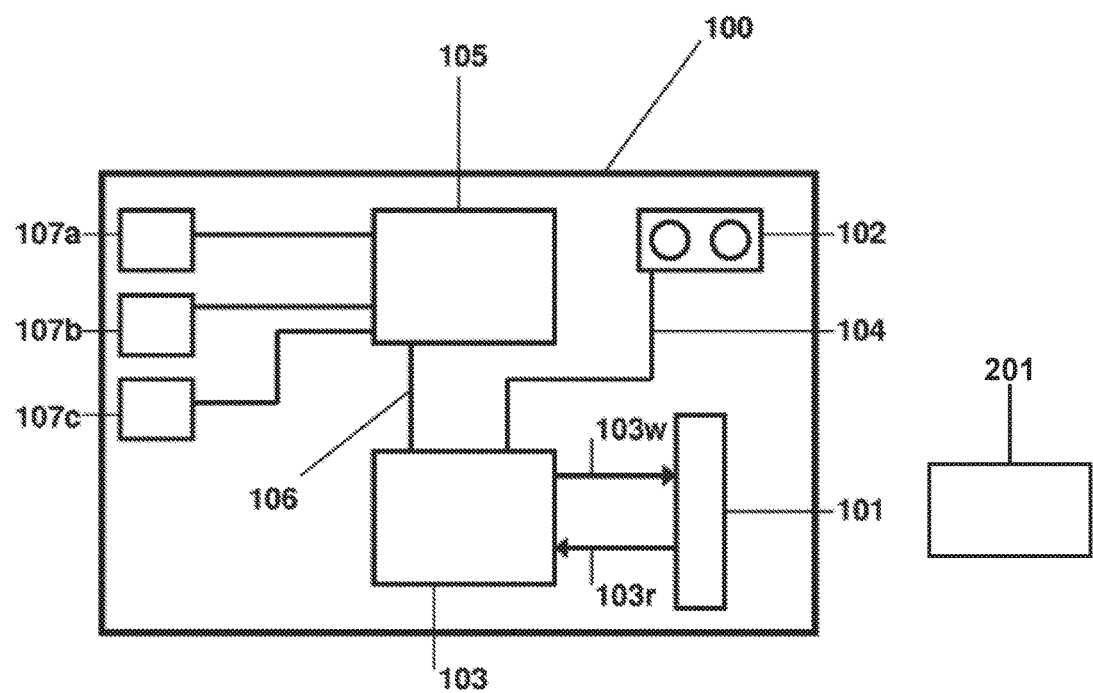

DEVICE AND METHOD FOR MANAGING ELECTRONIC FACILITIES OF BUILDINGS

TECHNICAL FIELD OF THE INVENTION

The present disclosure relates generally to the field of electronic facilities of buildings, and relates more particularly to a device and a method for managing electronic facilities of buildings such as intrusion systems, access control systems, home automation systems, climate control systems, illumination control systems and the like.

PRIOR ART

A growing number of buildings for private and public use are provided with increasingly sophisticated electronic facilities for automating and controlling various functions within the buildings.

For example, intrusion systems or access control systems may be implemented. An example of an intrusion system can be found in U.S. Pat. No. 7,804,403 B2.

Various home automation systems may also be implemented, for example climate control systems, illumination control systems, energy consumption control systems for buildings, and the like.

Each of these systems is usually provided with a control unit for managing the system. The user may operate the system by means of an interface connected to the control unit. The interface may consist in an alphanumeric keypad and/or a reader for identification devices. In particular, the management of the system may be protected, for example by means of passwords and/or special devices for identification such as smart cards, tags or the like. In order to use the electronic facility, the user must enter his password and/or insert his identification device.

Consequently, if a single building has various electronic facilities, each user must be able to manage each of the electronic facilities separately. In particular, each user must be provided with the password and/or the identification device for each of the electronic facilities. The management of various passwords and/or various identification devices, for example various smart cards, may be complicated and particularly inconvenient for the user.

Furthermore, if the user works in various buildings in which various electronic facilities are installed, the number of passwords and/or identification devices required will increase still further.

In view of these considerations, the object of the present disclosure is to overcome the aforementioned drawbacks. In particular, the object of the present disclosure is to simplify the management of one or more electronic facilities of one or more buildings.

SUMMARY OF THE DISCLOSURE

The present disclosure is based on the idea of managing electronic facilities of buildings by reading one or more files from a portable storage device, the reading being based on cryptography techniques, and subsequently adjusting one or more parameters of the electronic facilities on the basis of the result of the reading of the files from the portable storage device. In particular, the present disclosure is based on the idea of providing a device for managing electronic facilities of buildings in a control unit adapted to read files from a portable storage device, wherein the reading of the files from the portable storage device is based on cryptography techniques, and wherein the control unit is adapted to operate one or more electronic facilities on the basis of the result of the reading of the files from the portable storage device. Thus the user can manage a plurality of electronic facilities of buildings simultaneously in a simple manner and by using a single portable storage device. In particular, the device is particularly appropriate for the simultaneous management of different electronic facilities using a single portable storage device. The different electronic facilities may be located in a single building or in two or more separate buildings.

In one embodiment of the present disclosure, a device is provided for managing electronic facilities of buildings, the device including one or more interface elements for connecting the device to one or more electronic facilities of a building; a connection element for the connection of a portable storage device; and a control unit for reading files from the portable storage device, wherein the reading of the files from the portable storage device is based on cryptography techniques, and wherein the control unit is adapted to operate the one or more electronic facilities by means of said one or more interface elements on the basis of the result of the reading of the files from the portable storage device. The device according to the present disclosure is therefore particularly versatile and may be connected by means of suitable interface elements to various types of electronic facilities of a building. If the device comprises a single interface element, it may be used for managing a single electronic facility. This embodiment of the disclosure could be particularly advantageous for updating the management of an electronic facility already present in the building, and, in particular, for enabling one or more users to manage the electronic facility by means of a simple portable storage device, for example a commonly used portable storage device such as a USB (Universal Serial Bus) key or a memory card. If the device comprises a plurality of interface elements, it may be used for simultaneously managing a plurality of electronic facilities. This embodiment of the disclosure may be used advantageously for combining and thereby simplifying the management of various electronic facilities. The users can manage the various electronic facilities by using a single portable storage device. Each user can be provided with his own portable storage device which enables him to manage a plurality of different electronic facilities of the building in a simple manner. Since the reading of the files from the portable storage device is based on cryptography techniques, the system is particularly secure and personalized. The connection element for connecting a portable storage device may be, for example, a female connection element such as a USB port or a slot for a memory card.

In a further embodiment of the present disclosure, a device is provided in which the control unit is adapted to adjust one or more parameters of the one or more electronic facilities on the basis of the result of the reading of the files from the portable storage device. The parameters can then be adjusted, for example on the basis of the identification of the user who is in possession of the portable storage device.

In a further embodiment of the present disclosure, a device is provided in which the control unit is adapted to operate two or more electronic facilities of a building.

In a further embodiment of the present disclosure, a device is provided in which the cryptography techniques comprise the RSA (Rivest, Shamir, Adleman) technique. This technique is particularly accurate and secure, and therefore enables the security of the device to be optimized.

In a further embodiment of the present disclosure, a device is provided which further comprises a user interface element adapted to enable the user to activate and/or deactivate the reading of the files from the portable storage device. The user interface element could consist of a simple button which must be pressed by the user in order to start the reading of the files from the portable storage device. Alternatively, the user interface element could be more elaborate and could comprise, for example, a screen on which messages containing user instructions can be displayed. The user interface element could comprise a multiplicity of keys with different functions, for example a numeric keypad or the like.

In a further embodiment of the present disclosure, a device is provided in which the control unit is further adapted to generate and/or write files to the portable storage device, and the writing of the files to the portable storage device is based on cryptography techniques, for example on the RSA (Rivest, Shamir, Adleman) technique. This embodiment of the present disclosure may be used to configure portable storage devices which may be distributed to various users. In particular, the writing of the files is such that the portable storage devices are made recognizable during the reading step whenever the user inserts the storage device into the device for managing the electronic facilities. This embodiment of the present disclosure may therefore be used to adapt pre-existing portable storage devices in a simple manner to the device according to the present disclosure. Each user could therefore be authorized to manage the electronic facilities of the building by the activation of a portable storage device already in the possession of the user. It is therefore unnecessary to distribute to the users new storage devices for interacting with the device according to the present disclosure, because the storage devices which each user already possesses as a rule can simply be adapted, by writing suitable files on them, to the device. Owing to the use of cryptography techniques, the security of the system can be assured. In particular, each portable storage device can be configured in a unique and non-reproducible way by writing suitable files using cryptography techniques. For example, the security of the system can be optimized by using the RSA (Rivest, Shamir, Adleman) technique.

In a further embodiment of the present disclosure, a device is provided which further comprises a user interface element adapted to enable the user to activate and/or deactivate the writing of the files to the portable storage device. The user interface element could consist of a simple button which must be pressed by the user in order to start and/or interrupt the writing of the files to the portable storage device. For example, it could be necessary to keep the button pressed for a specified time interval in order to start the writing. Alternatively, the user interface element could be more elaborate and could comprise, for example, a screen on which messages containing user instructions can be displayed. The user interface element could comprise a multiplicity of keys with different functions, for example a numeric keypad or the like.

In a further embodiment of the present disclosure, a device is provided in which the generation of files by the control unit is based on the result of the reading of the files from the portable storage device. Thus files can be generated, for example, only if the connected portable storage device is recognized as suitable for receiving files by the device according to this embodiment of the disclosure.

In a further embodiment of the present disclosure, a device is provided in which the properties of the files written to the portable storage device depend on the type of electronic facilities connected to the device through said one or more interface elements. The device according to the present disclosure could therefore be adapted to recognize the type of electronic facility connected to it, and then to write various files to the portable storage device on the basis of the type of electronic facility. The device is therefore particularly versatile and can be used to manage various types of electronic facilities and therefore to configure the portable storage devices on the basis of the electronic facilities connected to it. The same device can therefore be used to manage completely different electronic facilities. On the basis of the facilities connected to the device, the device configures the portable storage devices in a simple manner while avoiding the use of redundant information.

In a further embodiment of the present disclosure, a device is provided in which the control unit is further adapted to delete files from the portable storage device. Thus the system can, for example, disable users from managing the device by deleting from the corresponding portable storage devices the files that would have to be recognized in the reading step.

In a further embodiment of the present disclosure, a device is provided in which the connection element comprises a USB (Universal Serial Bus) port. This enables the device according to the present disclosure to be used by means of USB keys, a type of portable storage device which is very commonly used and is therefore possessed by the great majority of users. The device according to this embodiment can therefore be used by many users, by means of USB keys which are already in the possession of the users.

In a further embodiment of the present disclosure, a device is provided in which the electronic facilities comprise one or more of the following facilities: intrusion systems, access control systems, home automation systems, climate control systems, and illumination control systems. The device according to this embodiment of the present disclosure can therefore be used to manage some of the most commonly used electronic facilities in both residential and commercial buildings.

According to a further embodiment of the present disclosure, a device is provided including a plurality of interface elements adapted to connect the device to one or more electronic facilities of a building, in which each of the interface elements is adapted to connect the device to a specific electronic facility of the building, thus enabling the device to manage different electronic facilities of the building simultaneously. Thus the device according to this embodiment of the present disclosure can be used to manage different electronic facilities already present in the building, thereby providing uniform management of these facilities. In particular, a single portable storage device can be used to simultaneously manage the different electronic facilities connected with the device by means of the interface elements.

In a further embodiment of the present disclosure, a device is provided which further comprises a management unit adapted to manage the electronic facilities through said one or more interface elements. Thus the specific operations of the electronic facilities are managed, in addition to the activation and/or deactivation of the electronic facilities. The management unit may be adapted, for example, to configure the various operating parameters of the various electronic facilities connected to the device according to the present disclosure. This configuration may depend on the result of the reading of the files stored in the portable storage device. The management unit may, for example, be connected to the control unit so as to operate on the basis of the result of the reading. In particular, on the basis of the result of the reading of the files stored in the portable storage device, the management unit can control in a specific manner the various electronic facilities connected to the device. For example, according to the result of the reading of the files stored in the portable storage device, the device may set various parameters of the various connected electronic facilities. Furthermore, according to the result of the reading of the files stored in the portable storage device, the device may activate and/or deactivate the management of the electronic facilities.

In particular, according to a further embodiment of the present disclosure, a device is provided in which the management unit is connected to the control unit so as to activate and/or deactivate and/or control the management of the electronic facilities according to the result of the reading of the files from the portable storage device.

In a further embodiment of the present disclosure, a control unit of an electronic facility of a building is provided, including a device for managing electronic facilities of a building according to the present disclosure, for example as indicated in the preceding paragraphs.

In a further embodiment of the present disclosure, a method is provided for configuring a device for managing electronic facilities of buildings according to the present disclosure, including the following steps:

creation of an installer portable storage device, the installer portable storage device consisting in a portable storage device, for example a USB key or a memory card, to which an installer file is saved, including a random installer code (I-code) and a random system code (S-code) associated with the random installer code (I-code);

reading of the installer portable storage device by means of the device for managing electronic facilities of buildings, so as to save the installer file to the memory of the control unit of the device.

Thus the portable storage devices authorized to operate the device according to the present disclosure can be recognized on the basis of the recognition of the I-code and S-code. In particular, the portable storage devices authorized to operate the device according to the present disclosure can be the portable storage devices to which a file containing the random system code (S-code) has been saved. These portable storage devices are therefore authorized to operate the devices to whose memories the installer file, including a random system code (S-code) identical to that saved to the portable storage device, has been saved.

The installer portable storage device can be created by means of a device according to a particular embodiment of the present disclosure, duly configured so as to be adapted to generate and write the installer file to the portable storage device. Alternatively, the installer portable storage device can be created by means of a computer, such as a PC, programmed to generate the installer file and write it to the portable storage device.

In a further embodiment of the present disclosure, a method is provided for configuring a device for managing electronic facilities of buildings according to the present disclosure, including the following additional step:

creation of an updated installer portable storage device, the updated installer portable storage device consisting in a portable storage device to which an updated installer file has been saved, the file including the random installer code (I-code), the random system code (S-code) associated with the random installer code (I-code), and a further updated random installer code (I-code'), so as to associate the random system code (S-code) with the further updated random installer code (I-code').

Thus the system can be updated so as to be operable solely by means of the updated installer portable storage device and not by means of the original portable storage device, thus increasing the security of the system. For example, the system can be updated by replacing the S-code/I-code pair with the new S-code/I-code' pair in the memory of one or more devices for managing electronic facilities. A portable storage device containing a file with the S-code/I-code pair only would no longer be able to operate the devices, because these would now be set so as to recognize the new S-code/I-code' pair.

The updated installer portable storage device can be created by means of a device according to a particular embodiment of the present disclosure, duly configured so as to be adapted to generate the updated installer file and write it to the portable storage device. Alternatively, the updated installer portable storage device can be created by means of a computer, such as a PC, programmed to generate the updated installer file and write it to the portable storage device.

In a further embodiment of the present disclosure, a method is provided for configuring a device for managing electronic facilities of buildings according to the present disclosure, including the following additional step:

creation of an updated installer portable storage device, the updated installer portable storage device consisting in a portable storage device to which an updated installer file is saved, the file including the random installer code (I-code), the random system code (S-code) associated with the random installer code (I-code), a further updated random installer code (I-code"), and a further updated random system code (S-code") associated with the further updated random installer code (I-code").

Thus various systems can be operated simultaneously by means of the same updated installer portable storage device, since the latter contains two pairs of respectively associated installer codes and system codes. In particular, the updated installer portable storage device created in this way can operate all the systems whose system code matches the first system code (S-code) and all the systems whose system code matches the further updated random system code (S-code").

The step according to this embodiment of the present disclosure can advantageously be repeated iteratively so as to generate various pairs of respectively associated installer codes and system codes in order to operate the same number of separate systems for managing electronic facilities of buildings.

The updated installer portable storage device created in this way is capable of managing various devices or groups of devices according to embodiments of the present disclosure.

The updated installer portable storage device can be created by means of a device according to a particular embodiment of the present disclosure, duly configured so as to be adapted to generate the updated installer file and write it to the portable storage device. Alternatively, the updated installer portable storage device can be created by means of a computer, such as a PC, programmed to generate the updated installer file and write it to the portable storage device.

In a further embodiment of the present disclosure, a method is provided for managing electronic facilities of buildings, including the following steps: reading one or more files from a portable storage device, said reading being based on cryptography techniques; and adjusting one or more parameters of said electronic facilities on the basis of the result of the reading of the files from said portable storage device. Thus various electronic facilities of buildings can be managed in a simple and versatile manner by means of a portable storage device such as a USB key or a memory card.

In a further embodiment of the present disclosure, a method is provided in which two or more electronic facilities of a single building are managed simultaneously. In particular, two or more electronic facilities of a single building can be managed by means of a single portable storage device. Thus the user of the building can manage two or more electronic facilities of a single building, his home or his office for example, by means of a single portable storage device, for example a USB key.

In a further embodiment of the present disclosure, a method is provided in which two or more electronic facilities of two or more separate buildings are managed simultaneously. In particular, two or more electronic facilities of two or more separate buildings can be managed by means of a single portable storage device. Thus the user of the buildings can manage two or more electronic facilities of two or more separate buildings, for example his home and his office, or his home and a hotel in which he is residing temporarily, by means of a single portable storage device, for example a USB key.

In a further embodiment of the present disclosure, a method is provided in which the electronic facilities comprise one or more of the following facilities: intrusion systems, access control systems, home automation systems, climate control systems, and illumination control systems.

BRIEF DESCRIPTION OF THE DRAWINGS

FIG. 1 shows schematically the architecture of a device for managing electronic facilities of buildings according to an embodiment of the present disclosure.

DETAILED DESCRIPTION

The present disclosure is described below with reference to particular embodiments as illustrated in the attached sheets of drawings. However, the present disclosure is not limited to the particular embodiments described in the following detailed description and represented in the drawings; instead, the described embodiments simply exemplify the various aspects of the present disclosure, the object of which is defined by the claims.

Further modifications and variations of the present disclosure will be evident to those skilled in the art. The present description must therefore be considered as inclusive of all said modifications and/or variations of the present disclosure, the object of which is defined by the claims.

FIG. 1 shows schematically the architecture of a device 100 for managing electronic facilities of buildings according to an embodiment of the present disclosure.

In the example shown in FIG. 1, the device 100 comprises three interface elements 107a, 107b and 107c, each of these being adapted to connect the device 100 to a specific electronic facility of a building. The number and nature of the interface elements in the devices according to the present disclosure may vary. For example, according to an embodiment of the present disclosure, the device 100 comprises a single interface element, and may therefore be used for managing a single electronic facility. Alternatively, the device 100 may comprise two or more interface elements in such a way that it can be connected simultaneously to two or more electronic facilities. In particular, each interface element may be adapted to connect the device 100 to a specific electronic facility of the building in such a way that the device 100 is adapted to manage different electronic facilities of the building simultaneously. For example, the system shown schematically in FIG. 1 is adapted to be connected simultaneously to three different electronic facilities. A first electronic facility of the building is connected by means of the first interface element 107a. A second electronic facility of the building is connected by means of a second interface element 107b. A third electronic facility of the building is connected by means of the third interface element 107c. The electronic facilities that can be connected simultaneously to the device 100 may be different from one another. For example, in the case shown in FIG. 1, the three electronic facilities may be different from one another.

In general, the device 100 may comprise a plurality of interface elements adapted to connect the device 100 to one or more electronic facilities of a building, in which each of the interface elements is adapted to connect the device 100 to a specific electronic facility of the building, thus enabling the device 100 to manage different electronic facilities of the building simultaneously.

The interface elements may be of different types, as is known to those skilled in the art. Each of the interface elements can be used to form the connection between the device 100 and one or more electronic facilities of a building. In particular, each of the interface elements can enable information to be exchanged in both directions, in other words both the inward and outward directions, between the device 100 and the electronic facility connected to it by means of the interface element. Alternatively, each of the interface elements can enable information to be exchanged in the outward direction only, that is to say only from the device 100 toward the electronic facility connected to it by means of the interface element. A device according to a particular embodiment of the present disclosure may comprise any combination of one or more interface elements which enable information to be exchanged in either the inward or the outward direction with one or more interface elements which enable information to be exchanged in the outward direction only. The interface elements may therefore comprise transmitters, receivers or transceivers.

Additionally, the interface may be formed using specific channels or buses, of either the wireless or the cable connection (wired bus) type. In this case, each of the interface elements may therefore be adapted to form a specific type of connection. Additionally, the connection between the device 100 and one or more of the electronic facilities of the building can be formed by means of a dry contact, for example by means of a pair of electrical cables.

Additionally, the device 100 may be incorporated (embedded) in a control system of a specific electronic facility of a building. In this case, the interface between the device 100 and the control system can be formed by means of suitable electronic connections which serve as interface elements. In this case, the device 100 may form part of a specific electronic facility of a building (such as an intruder alarm system, a home automation system, an access control system or the like) by being integrated into it, for example in the control system of the electronic facility or in a keypad or in any other interface of the electronic facility.

A single device 100 according to the present disclosure may comprise a plurality of different interface elements. For example, a device 100 according to the present disclosure may be incorporated into the control system of a specific electronic facility of a building, while also including one or more further interface elements which enable it to be connected to other electronic facilities of the same building. Additionally, a device 100 according to the present disclosure may comprise a plurality of identical interface elements which enable it to be connected to different electronic facilities. Additionally, a single device 100 according to the present disclosure may comprise a multiplicity of interface elements adapted to form a wireless connection with the electronic facilities of the building. In particular, according to a particular embodiment of the present disclosure, all the interface elements of the device 100 are adapted to form a wireless connection with the electronic facilities of the building.

Each of the interface elements can enable the connection to be made between the device 100 and the control unit of a specific electronic facility of a building. By means of the connection between the device 100 and the control unit of the electronic facility of a building, the control of the operations of the electronic facility is ultimately managed by the device 100. For example, the device 100 can control the activation and/or deactivation of the electronic facility. Additionally, the device 100 may control the operations of the electronic facility in a specific manner, for example by setting and then controlling the specific operating parameters of the electronic facility. For example, if the electronic facility comprises a climate control system for the building, the device 100 may simply control the activation and/or deactivation of the climate control system, while the control unit of the climate control system independently manages the parameters relating to the climate control (such as the temperature and/or humidity of the environment). In practice, in this case the device 100 enables the climate control system to be switched on and/or off. Alternatively, the device 100 may be adapted to directly manage the parameters relating to the climate control, so as to directly set the desired temperature of the environment for example. In this case, the device 100 acts directly on the settings of the control unit of the climate control system.

The information exchange between the device 100 and each of the electronic facilities of the building to which the device is connected therefore takes place by means of the interface elements.

The device 100 shown schematically in FIG. 1 further comprises a connection element 101 for connecting a portable storage device 201. In particular, the connection element 101 may be a female element, such that the portable storage device 201 can be housed completely or partially in the female connection element 101 so as to create a connection between the device 100 and the portable storage device 201. The device 100 according to the present disclosure may be provided with different types of connection elements 101, for example connection elements for different types of portable storage devices.

The female connection element 101 may, for example, comprise a USB (Universal Serial Bus) port. In this case, the portable storage device 201 may consist in a USB key. Thus the device 100 can be operated by means of USB keys which are generally available.

Alternatively, the female connection element 101 may comprise a slot for memory cards. In this case, the portable storage device 201 may consist in a memory card. The memory card slot may be of various types. In particular, the memory card slot may be adapted to house different types of memory cards, for example memory cards according to different standards.

The female connection element 101 may also comprise any type of female connector element, whether standard or proprietary, for reading portable storage devices 201 having corresponding male connector elements.

In alternative embodiments of the present disclosure, the connection element 101 may be a male connection element, the male element being adapted to make a suitable connection with a portable storage device.

The device 100 further comprises a control unit 103. The control unit 103 is connected to the connection element 101 so as to be able to read files saved to the portable storage device 201, as shown schematically in FIG. 1 by the arrow 103r. In particular, the control unit 103 is adapted to read files from the portable storage device 201 connected to the device 100 by means of the connection element 101.

The control unit 103 is adapted to operate by means of cryptography techniques. In particular, the reading of the files from the storage device 201 is based on cryptography techniques, thereby making the management of the electronic facilities of the building by means of the storage device 201 secure and reliable.

For example, the control unit 103 may be adapted to operate by means of cryptography algorithms of the RSA (Rivest, Shamir and Adleman) type. Thus the security of the system is optimized.

The control unit 103 is adapted to operate the electronic facilities of the building on the basis of the result of the reading of the files from the portable storage device 201. In particular, the control unit 103 may be connected to the interface elements of the device 100 so as to activate and/or deactivate the connection between the device 100 and the various electronic facilities of the building by acting on the interface elements. The control unit 103 may be connected to each of the interface elements directly or, as detailed below, through a management unit 105.

On the basis of the result of the reading of the files from the portable storage device 201, the control unit 103 may, for example, activate the connection between the device 100 and a specific electronic facility of the building by means of the interface element 107a. Additionally, when the connection between the device 100 and a specific electronic facility of the building has been activated, the control unit 103 may be adapted to manage the electronic facility on the basis of the result of the reading of the files from the portable storage device 201. In particular, the control unit 103 may be adapted to set the operating parameters of the electronic facility. According to a further example, the control unit 103 may deactivate the connection between the device 100 and the electronic facility, for example in the case in which the reading of the files from the portable storage device 201 yields a negative outcome.

The device 100 shown in FIG. 1 further comprises a user interface element 102 adapted to enable the user to activate and/or deactivate the reading of the files from the portable storage device 201. In particular, the user interface element 102 is connected to the control unit 103 by means of the connection 104. The user interface element 102 may consist, for example, of a button which must be pressed by the user in order to start the reading of the files from the portable storage device 201. Alternatively, the user interface element 102 may be more elaborate and may comprise, for example, a screen on which messages containing user instructions can be displayed. The user interface element 102 may also comprise a multiplicity of keys with different functions, for example a numeric keypad or the like, to enable the user to enter data, such as a password, to activate the reading of the files from the portable storage device 201.

In alternative embodiments of the present disclosure, the control unit 103 may also be adapted to write files to the portable storage device 201 connected to the device 100 by means of the connection element 101, as shown schematically on the drawing by the arrow 103w. The writing may be based on cryptography techniques, for example cryptography algorithms of the RSA (Rivest, Shamir and Adleman) type. Thus the device 100 can write files to the portable storage devices and can therefore create portable storage devices adapted to operate the device 100 itself. This enables further users to be authorized to use the device 100. In particular, the control unit 103 may be adapted to write to the portable storage devices the files which will subsequently be used, in the reading step, for managing the device 100.

The control unit 103 may also be adapted to generate files, for example files which are subsequently written to a portable storage device 201 connected to the device 100 by means of the connection element 101.

In particular, the control unit 103 may be adapted to delete files from the portable storage devices so as to disable the management of the device 100. This enables specific users to be disabled from the management of the device 100. In particular, the control unit 103 may be adapted to delete from the portable storage devices the files that are to be used in the reading step. A subsequent insertion of these portable storage devices into the device 100 would result in a negative outcome of the reading, thus making it impossible for a user in possession of these portable storage devices to use the device.

The user interface element 102 may be adapted to enable the user to activate and/or deactivate the writing of files to the portable storage device 201 and/or their deletion therefrom. Additionally, the user interface element 102 may be adapted to enable the user to activate and/or deactivate the generation of files. The user interface element 102 may consist, for example, of a button which must be kept pressed by the user for a specified time interval in order to start the reading and/or deletion of the files from the portable storage device 201. Alternatively, the user interface element 102 may be more elaborate and may comprise, for example, a screen on which messages containing user instructions can be displayed. The user interface element 102 may also comprise a multiplicity of keys with different functions, for example a numeric keypad or the like, to enable the user to enter data such as a password so as to activate the reading and/or the deletion of the files from the portable storage device 201.

In a further embodiment of the present disclosure, the device 100 is such that the properties of the files written to the portable storage device 201 depend on the type of electronic facilities connected to the device 100 by means of the interface elements. In fact, the control unit 103 can be adapted to recognize the type of electronic facility connected to the device 100 by means of the interface elements, and then to write various files to the portable storage device 201 on the basis of the type of electronic facility recognized. Thus specific portable storage devices may be created according to the electronic facilities of the building that are actually connected to the device 100.

The use of cryptography techniques in both reading and writing, for example RSA techniques with public and private keys, is particularly advantageous. In particular, it is possible to ensure that the keys used in the device cannot be deduced; in other words, none of the devices can be cloned. It is also possible to ensure that the information contained in the files cannot be decoded, so as to keep the users' personal information secure.

Additionally, the devices according to the present disclosure may be such that they use the files in "copy protected" mode, in which none of the files will operate if transferred to another storage device (in other words, the file is unique and restricted to its container), or in "copy permitted" mode, in which the files can be stored in other storage devices or can be easily cloned more than once, in order to provide many portable storage devices having the same system management rights.

The device 100 shown schematically in FIG. 1 further comprises a management unit 105. The management unit 105 is adapted to manage the electronic facilities of the building by means of the interface elements. For example, as shown in FIG. 1, each of the interface elements 107a, 107b, 107c is connected directly to the management unit 105. In turn, the management unit 105 is connected to the control unit 103 by means of the connection 106.

The management unit 105 may therefore be adapted to activate and/or deactivate the connection between the device 100 and each of the electronic facilities connected by means of the interface elements. Additionally, the management unit 105 may be adapted to operate each of the electronic facilities directly. For example, the management unit 105 may be adapted to set the operating parameters of each of the electronic facilities. The information relating to these parameters is transmitted by the management unit 105 to each of the control units of the various electronic facilities by means of the communications channels formed by means of the interface elements. Thus the management of the electronic facilities is carried out directly by means of the device 100. On the other hand, if the management unit 105 is simply adapted to activate and/or deactivate the connection between the device 100 and each of the connected electronic facilities, the management of the electronic facilities is carried out by the respective control units, while the device 100 is responsible for the activation or deactivation of the individual control units. In this case, the device 100 may, for example, simply control the switching on and/or off of the individual control units, each of which manages electronic facilities. The main advantage of this embodiment lies in the simplicity of the architecture of the management unit 103. Additionally, in this mode, the individual electronic facilities are managed directly by their own control units. This makes it easy to integrate the device 100 into different electronic facilities, including existing electronic facilities which have already been installed in the building for some time.

The management unit 105 may be connected to the control unit 103 (connection 106, shown in FIG. 1). This enables the activity of the management unit 105 to be made dependent on the result of the reading of the files from the portable storage device 201 executed by the control unit 103. In particular, on the basis of the result of the reading of the files from the portable storage device 201, the control unit 103 may activate and/or deactivate the management unit 105 which, in turn, activates, deactivates or controls the operations of the individual electronic facilities as described above.

Additionally, the device 100 may be adapted, by means of the connection between the management unit 105 and the control unit 103, to recognize the connected electronic facilities and then to write the appropriate files to the portable storage device 201. This is because the management unit 105 can be adapted to recognize the electronic facilities connected to the device 100 by means of the interface elements. The management unit 105 then sends a signal to the control unit 103 by means of the connection 106, on the basis of the type or types of electronic facilities recognized. In its turn, the control unit 103 writes various files to the portable storage device 201 on the basis of the type of signal received from the management unit 105. Thus the portable storage devices 201 are configured in a specific manner on the basis of the electronic facilities which are actually to be managed by means of the device 100.

The electronic facilities of buildings that can be managed by means of the device 100 may be of different types. In the first place, the term "building" should be understood as signifying any type of architectonic structure intended for public or private use. For example, the term "building" may signify buildings for private use, for residential use for example, such as apartments, houses or the like. It may also signify buildings for administrative and/or commercial use, such as offices, factories, stores or the like. It may equally well signify buildings for public use such as hotels, restaurants, bars, hospitals, shops, places of worship, or the like.

An example of an electronic facility of a building that can be managed by means of the device 100 is an intrusion system. These systems may comprise, for example, elements for emitting acoustic and/or light signals in case of forcible intrusion into the building in which they are installed. These systems may also be connected to central controllers so as to signal the forcible intrusion into the building to security authorities, for example. In this case, the device 100 may be adapted to activate and/or deactivate the intrusion system. Users in possession of the portable storage devices to which the appropriate files have been written are authorized to activate and/or deactivate the intrusion system simply by inserting the portable storage device and starting the reading by the control unit 103. If the outcome of the reading is positive, the intrusion system is activated and/or deactivated automatically by the device 100. A corresponding confirmation message could be displayed, for example by the user interface element 102.

A further example of an electronic facility of a building that can be managed by means of the device 100 is an access control system. These systems may control, for example, the opening and/or closing of doors of the building. In this case, the device 100 may be adapted to lock and/or unlock one or more doors of a building. Users in possession of the portable storage devices to which the appropriate files have been written are authorized to lock and/or unlock access to the building simply by inserting the portable storage device and starting the reading by the control unit 103. If the outcome is positive, the access control system activates the locking or unlocking of the access. A corresponding confirmation message could be displayed, for example by the user interface element 102. This type of use of the device 100 could be particularly advantageous in hotels, for example.

A further example of an electronic facility of a building that can be managed by means of the device 100 is a home automation system. These systems may be more or less complex and may manage various types of electronic equipment installed in the building, for example domestic appliances, systems for controlling the power consumption of the building, systems for the security of the building, communications systems, and others. Users in possession of the portable storage devices to which the appropriate files have been written are authorized to manage these home automation systems by means of the device 100. The management may consist in the simple activation and deactivation of the home automation system, for example switching the home automation system on or off, or may consist in the detailed management of the various control parameters of the home automation system.

For example, the files written to the portable storage device could vary from one user to another, according to the personalized settings of each user. On the basis of the reading of the files from the portable storage device, the device 100 can then, for example, manage the home automation system on the basis of the personalized settings of the user who has inserted his portable storage device into the device 100.

A further example of an electronic facility of a building that can be managed by means of the device 100 is a climate control system, for example an HVAC (Heating, Ventilation and Air Conditioning) system. These systems can be used for the automatic control of the climatic conditions of the environments in which they are installed. These systems can be used, for example, to control the temperature and/or the humidity of the environments in which they are installed. Users in possession of the portable storage devices to which the appropriate files have been written are authorized to manage these climate control systems by means of the device 100. The management may consist in the simple activation and deactivation of the climate control system, for example switching the climate control system on or off, or may consist in the detailed management of the various control parameters of the climate control system. For example, the files written to the portable storage device could vary from one user to another, according to the personalized settings of each user, such as the desired temperature and/or the humidity. On the basis of the reading of the files from the portable storage device, the device 100 can then, for example, manage the climate control system on the basis of the personalized settings of the user who has inserted his portable storage device into the device 100.

A further example of an electronic facility of a building that can be managed by means of the device 100 is an illumination control system. These systems can be used, for example, to control the level of illumination of various environments, according to a timetable for example, thereby optimizing electricity consumption. Users in possession of the portable storage devices to which the appropriate files have been written are authorized to manage these illumination control systems by means of the device 100. The management may consist in the simple activation and deactivation of the illumination control system, for example switching the illumination control system on or off, or may consist in the detailed management of the various control parameters of the illumination control system. For example, the files written to the portable storage device could vary from one user to another, according to the personalized settings of each user, such as the desired level of illumination. On the basis of the reading of the files from the portable storage device, the device 100 can then, for example, manage the illumination control system on the basis of the personalized settings of the user who has inserted his portable storage device into the device 100.

The device 100 according to the present disclosure can be used to manage in a simple manner any combination of electronic facilities of the types listed above, installed in the same building. The device 100 can, for example, simultaneously manage an intrusion system and a climate control system installed in a building.

Some specific cases of operation of a device 100 in various operating scenarios are described below by way of example.

If the device 100 is connected to an intrusion system, the control unit 103 may be adapted to write to the portable storage device 201 a file containing a unique identifier for each user, for example a file containing information of the ID tag type. Thus the portable storage device 201 becomes a unique ID tag. The system may be such that this writing operation can be executed only by a system administrator user. The control unit 103 is capable of recognizing the files containing the identifiers authorized to operate the device 100. In particular, the system administrator may, for example, program the control unit 103 so as to recognize and accept the authorized identifiers. The administrator may, for example, program the portable storage device as a valid tag of the system. A user in possession of the portable storage device 201 to which one of the files including the authorized identifier has been written may activate and/or deactivate the intrusion system simply by inserting his portable storage device into the connection element 101. The system rejects portable storage devices to which files have been written including identifiers which are unauthorized, for example because they are not known to the system or because the administrator has expressly indicated that they are unauthorized. In this case, the system may disregard these storage devices and remain deactivated, or send an error message. In any case, the system does not allow the intrusion system to be managed when the inserted portable storage device does not contain a file containing an authorized identifier.

If the device 100 is connected to an access control system, the control unit 103 may be adapted to write to the portable storage device 201 not only a file containing a unique identifier for each user, for example a file containing ID tag information, but also one or more files containing information relating to specific configurations associated with each user. These files may contain, for example, information relating to the areas of the building which each user may access. Additionally, the system may be capable of writing files which also contain information relating to the period of validity of the authorized identifier. This option is particularly advantageous in cases where users are to be authorized to use the device 100 for predetermined time intervals only. The system may be such that this file writing operation can be executed only by a system administrator user. The control unit 103 is capable of recognizing the files containing the identifiers authorized to operate the device 100 and the corresponding specific configurations. In particular, the system administrator may, for example, program the control unit 103 so as to recognize and accept the authorized identifiers. A user in possession of the portable storage device 201 to which one of the files including the authorized identifier and the corresponding configurations have been written may activate and/or deactivate the access control system simply by inserting his portable storage device into the connection element 101. The system recognizes the specific authorized user and reads his configurations. The system can then manage the access of each user to various areas of the building. The system rejects portable storage devices to which files including unauthorized identifiers have been written, for example because they are not known to the system, because they have been expressly indicated as unauthorized by the administrator, or because they have expired.

If the device 100 is connected to an access control system, the control unit 103 may be adapted to write to the portable storage device 201 not only a file containing a unique identifier for each user, for example a file containing ID tag information, but also one or more files containing information relating to specific configurations associated with each user. These files may contain, for example, information relating to the areas of the building which each user may access. Additionally, the system may be capable of writing files which also contain information relating to the period of validity of the authorized identifier. This option is particularly advantageous in cases where users are to be authorized to use the device 100 for predetermined time intervals only. The system may be such that this file writing operation can be executed only by a system administrator user. The control unit 103 is capable of recognizing the files containing the identifiers authorized to operate the device 100 and the corresponding specific configurations. In particular, the system administrator may, for example, program the control unit 103 so as to recognize and accept the authorized identifiers. A user in possession of the portable storage device 201 to which one of the files including the authorized identifier and the corresponding configurations has been written may activate and/or deactivate the access control system simply by inserting his portable storage device into the connection element 101. The system recognizes the specific authorized user and reads his configurations. The system can then manage the access of each user to various areas of the building. The system rejects portable storage devices to which files including unauthorized identifiers have been written, for example because they are not known to the system, because they have been expressly indicated as unauthorized by the administrator, or because they have expired.

The preceding paragraphs have described the possible operation of the device according to the present disclosure in the case of specific individual electronic facilities of buildings. When the device according to the present disclosure is adapted to operate two or more electronic facilities of this type, the device according to the present disclosure may be capable of carrying out the operations corresponding to each of the facilities.

In general terms, according to the present disclosure, a method is provided for managing electronic facilities of buildings, including the following steps: reading one or more files from a portable storage device, the reading being based on cryptography techniques, and adjusting one or more parameters of said electronic facilities on the basis of the result of the reading of the files from said portable storage device.

The files contained in the portable storage device may comprise a unique ID such that the portable storage device becomes a unique ID tag. Thus the reading of the files by the method according to one embodiment of the present disclosure makes it possible to identify the user in possession of the portable storage device.

The parameters of the electronic facilities may be adjusted on the basis of this identification. For example, the system may be such that each specific identified user is associated with a set of one or more predetermined parameters for each of the electronic facilities to be managed.

The parameters associated with each user can be saved, for example within the device itself. In practice, in this scenario, the device is adapted to identify the user and then associate him with specified parameters which may already be in the store of the device as being associated with this specified user.

Alternatively, the information relating to the parameters of each user may be saved directly to the user's portable storage device so as to be read in the reading step. Thus, both the user's identity and the corresponding parameters are read in the reading step. In this case, the files contained in the portable storage device comprise not only the unique ID for making the portable storage device into a unique ID tag, but also the data relating to the specific parameters of the electronic facilities associated with the user who possesses the portable storage device.

Some specific cases of configuration operations of the system in various scenarios are described below by way of example.

If a plurality of devices 100 and a plurality of portable storage devices are to be configured in order to connect them, it is possible to proceed as follows.

The starting point is a plurality of unconfigured devices 100 and a plurality of unconfigured portable storage devices. The storage devices are defined as "unconfigured" if they contain no files adapted to operate the devices 100.

An installer portable storage device is created by saving to a first, unconfigured portable storage device an installer file which contains two associated random codes, namely an installer code (I-code) and a system code (S-code) associated with the installer code (I-code). The installer and system codes may be, for example, random codes.

In order to create this installer portable storage device, a first unconfigured portable storage device can be inserted in a first device 100, using the connection element 101 of the first device 100. The first device 100 can be configured so that it can create the installer file and write it to the first unconfigured portable storage device. In particular, the control unit 103 of the first device 100 can be adapted to create the installer file with the pair of associated codes, I-code and S-code, and to write it (as shown by the arrow 103w in FIG. 1) to the first unconfigured portable storage device. The first device is then adapted both to read files from the portable storage device and to write files to it. In this case, the system can be operated even without the aid of a PC.

Alternatively, the installer file can also be written to the first unconfigured portable storage device by means of a suitably programmed computer, such as a PC.

The operation of creating the installer file in the first portable storage device can be activated by a user by means of a user interface of the first device 100. For example, the operation can be activated by pressing an appropriate button or by pressing a specified button and keeping it pressed for a specified time interval, for example two seconds.

The installer portable storage device containing the two associated codes (I-code and S-code) can then be inserted into any of the further devices 100 which are to be configured. The control unit 103 of each of the further devices 100 is adapted to read the files contained in the installer portable storage device (arrow 103r in FIG. 1) and to store them within itself. In particular, the installer file with the random installer code (I-code) and the random system code (S-code) associated with the the random installer code (I-code) is stored in the control unit 103 of each of the further devices 100 in which the installer portable storage device is inserted.

Thus all the devices 100 of the system are configured and therefore correlated with each other, since they are provided with the same pair of associated random codes (I-code and S-code).

At this point, in order to configure each of the further portable storage devices which are as yet unconfigured, it is simply necessary to insert first the installer portable storage device and then the portable storage device which is to be configured into one of the configured devices 100. The user can activate this operation by means of a suitable input of the user interface of each of the devices 100. For example, each of the devices 100 can be provided with a button which must be pressed before inserting, one after the other, the installer portable storage device and the portable storage device which is to be configured.

The control unit 103 of each of the devices 100 is capable of recognizing the installer portable storage device, because it contains the installer file with the pair of codes I-code and S-code. The control unit 103 is also capable of recognizing the portable storage device which is to be configured, because the latter does not contain the installer file. The control unit 103 is therefore adapted to write the random system code (S-code) to the portable storage device which is inserted subsequently. Thus the portable storage device which is inserted subsequently is configured so as to be recognized by all the correlated devices 100 of the system, because it contains a file including the random system code (S-code). This portable storage device does not contain the random installer code (I-code), and therefore cannot be used as an installer portable storage device.

At this point, therefore, the system can be adapted to write further files to the portable storage device inserted subsequently, in order to define the various configurations of each user.

This procedure is repeated for all the storage devices to be configured.

Only the user in possession of the installer storage device (the administrator user) is able to configure further portable storage devices so as to make them compatible with the system.

In a further embodiment of the present disclosure, the portable storage devices can be configured by means of a suitably programmed computer, such as a PC. For example, after creating the installer portable storage device including the installer files with the pair of codes (I-code and S-code), the computer may be adapted to configure further portable storage devices by writing to them a recognition file including the system code (S-code) identical to the system code (S-code) of the I-code/S-code pair written to the installer portable storage device.

If the configuration of the installer portable storage device is to be modified, it is possible to proceed as follows. The starting point is a system of devices 100 which are already programmed and and therefore each provided with an I-code and S-code pair.

The installer portable storage device is inserted into one of the devices 100 of the system. The control unit 103 of the device 100 is adapted to recognize the installer portable storage device, because the latter contains the installer file with the I-code and the S-code. The control unit 103 is adapted to create a new random installer code (I-code') and to write it to the installer portable storage device, while retaining the preceding I-code. Thus an association is created between the S-code of the system and the new installer code (I-code'). Additionally, an updated installer portable storage device is created, containing both the preceding I-code and the new I-code', both of which are associated with the same system code (S-code). This operation can be activated by a user by means of a user interface of the device 100. For example, the operation can be activated by pressing an appropriate button or by pressing a specified button and keeping it pressed for a specified time interval, for example four seconds.

The updated installer portable storage device can also be created by means of a suitably programmed computer, such as a PC.

The updated installer portable storage device is inserted into each of the further devices 100 of the system. The control unit 103 of each of the further devices 100 is adapted to read the files contained in the updated installer portable storage device and to store them within itself. In particular, the control unit 103 is capable of recognizing that the storage device is an updated installer storage device, since it contains only one system code (S-code) and two installer codes, namely the preceding installer code (I-code) which is already stored in the control unit 103 and is therefore known, and the new installer code (I-code'), which is not yet stored in the control unit and therefore is not yet known. The control unit 103 is therefore adapted to replace the preceding I-code with the new I-code' in its store, so as to correlate the various devices on the basis of the new I-code'. The user can activate this operation by means of a suitable input of the user interface of each of the devices 100. For example, each of the devices 100 can be provided with a button which must be pressed before inserting the updated installer portable storage device.

After this operation has been executed and after all the devices 100 of the system have been updated with the new installer code (I-code'), any copy of the original installer portable storage device, in other words one containing only the original installer code (I-code) and not the new installer code (I-code'), will not be recognized by the system and therefore cannot be used. This is particularly advantageous, for example, in the case of undesired copying of the installer files with the codes I-code and S-code from the installer portable storage device, where it is permissible to copy files from the latter. Only the updated installer storage device, containing the code S-code and the two codes I-code and I-code', can operate the system.

If a new system of devices is to be created, using devices already programmed for a preceding system (by reprogramming the devices), it is possible to proceed as follows. The starting point is one or more devices already programmed for the preceding system and one or more devices which have not yet been programmed.

The installer portable storage device of the preceding system is inserted into one of the devices 100 of the new system. The control unit 103 of the device 100 of the new system recognizes the installer portable storage device of the preceding system, because the latter has a system code (S-code) and an installer code (I-code) which relate to the preceding system, and are therefore different from the new system codes, S-code" and I-code". The control unit 103 of the device 100 of the new system may be adapted to generate the new code pair, S-code" and I-code", which relate to the new system, and to write them to the installer portable storage device of the preceding system, thereby updating it. This operation can be activated by a user by means of a user interface of the device 100. For example, the operation can be activated by pressing an appropriate button or by pressing a specified button and keeping it pressed for a specified time interval, for example 8 seconds.

At this point, the updated installer portable storage device comprises two separate files with two installer codes (I-code and I-code") and two system codes (S-code and S-code"), and can therefore control both the preceding system and the new system.

When this updated installer portable storage device is inserted into further devices 100 of the new system, the control unit 103 of the devices 100 recognizes the updated installer portable storage device, because the latter contains both the codes relating to the preceding system and the codes relating to the new system. The control units 103 are therefore adapted to replace, within themselves, the codes relating to the preceding system with the codes relating to the new system. Thus the control units are reset in relation to the preceding system, and can no longer control it, while being configured so as to be able to manage the new system.

Additionally, when this updated installer portable storage device is inserted into further unprogrammed devices 100, the devices may be adapted so that it is possible to choose a system to which they are to be attached, by copying the appropriate code pair. For example, it is possible to choose whether to copy the I-code/S-code pair or the I-code"/S-code" pair. Therefore an installer can control different systems using a single updated installer portable storage device.

For example, the steps described above can be repeated iteratively so as to provide a predetermined number N of pairs of installation codes and system codes in a single updated installer portable storage device. Each of the N pairs may correspond to a specified device or group of devices. The installer will therefore be able to choose the desired copy when creating a new system of devices.

In one embodiment of the present disclosure, the devices may be adapted to be reset so as to delete the information contained in them. Thus they can be reconfigured in a simple manner.

It has been demonstrated that the present disclosure is capable of providing a system for managing electronic facilities of buildings which is highly versatile while also being secure.

The system can be used by any user by means of portable storage devices such as USB keys.

By using a single portable storage device, each user can simultaneously operate various electronic facilities of a building, since the portable storage device can contain various files for each of the electronic facilities of a building to be controlled.

The system is easily updatable, since the files in the portable storage device can be overwritten and updated, for example in order to manage electronic facilities whose performances are to be implemented with time.

Owing to the use of cryptography techniques, the security of the system is assured.

Additionally, on the basis of the present disclosure, a user in possession of a portable storage device 201 to which specific files have been written by means of a specific device 100, for example by means of the device 100 installed in the user's home, can cause further files to be written to the same portable storage device by means of one or more specific devices 100 installed elsewhere, for example in his office and/or in a hotel in which the user is temporarily residing. Thus the user can manage a multiplicity of electronic facilities installed in different buildings by means of a single portable storage device 201.

Additionally, in alternative embodiments of the present disclosure, the various devices 100 installed in different buildings can operate on the same file, or on the same files, written to a single portable storage device 201. For example, different manufacturers of the devices 100 may agree on the standards and properties of the files to be written to the portable storage devices of each user for the purpose of recognizing his identity and/or his specific configurations.

Each user may use portable storage devices of a preferred type, in terms of the color, shape and size of the portable storage devices for example, provided that they can be connected to the device 100 by means of the connection element 101. Thus the system is highly versatile.

Many persons carry a USB memory key or other portable storage devices (such as memory cards) in their pockets, and use them on a daily basis to store various types of files. It has been demonstrated that the present disclosure enables these common devices to be used as "personal electronic keys" for electronic facilities of buildings such as intrusion systems, access control and home automation systems. This is because the disclosure relates to a reader for these storage devices which can read and/or write special files from and to them; the files are encrypted and can contain all the personal information required to control the system. According to the present disclosure, the reader can be interconnected with various electronic facilities of buildings, thus providing a further control point enabling an end user to control these electronic facilities by means of portable storage devices.

It has also been demonstrated that, in one embodiment of the present disclosure, it is possible to have a basic application of a device according to the present disclosure in which the portable storage devices form part of a system which recognizes a portable storage device as a unique tag and assigns to it rights of access to, and/or control of, the system.

Additionally, in alternative embodiments of the present disclosure, it is possible to have advanced applications in which the device according to the present disclosure is capable of managing the system (for example by generating, writing or deleting files) using the portable storage devices, and can therefore add, for example, further data relating to a unique ID, such as an expiry date, a user access level, scenarios for home automation or HVAC (heating, ventilation and air conditioning) systems, and the like.

According to the present disclosure it is also possible for a plurality of separate systems to program their specific files in a portable storage device. Thus a single portable storage device can be a universal key for the plurality of systems with which the end user is to interact. Additionally, if this is agreed among different manufacturers, a single file can be used to manage different systems by storing all the information relating to the end user for all the systems. The information on the file can be unlimited, and a portable storage device can potentially interact with different systems at the same time, using a single management device (for example, disarming an intrusion system and controlling lighting and an HVAC system, simply by inserting a key in a reader).

Additionally, according to the present disclosure, the user can choose any storage device that he wishes (in terms of shape, color, size, and the like), thus making it unnecessary for system manufacturers to develop tags and keys with different designs.

Although the present disclosure has been described with reference to the embodiments described above, it will be clear to those skilled in the art that a variety of modifications, variations and improvements of the present disclosure can be provided on the basis of the teachings set out above and within the scope of the attached claims without departure from the subject and scope of protection of the disclosure.

For example, the system and method according to the present disclosure can be used for the simultaneous management of various types of electronic facilities of buildings, not only for the electronic facilities mentioned and described briefly above. Additionally, according to the present disclosure, two or more electronic facilities of a single building can be managed simultaneously. Additionally, two or more electronic facilities of two or more separate buildings can be managed simultaneously.

Furthermore, fields which are considered to be known to those skilled in the art have not been described, in order to avoid encumbering the description of the disclosure with excessive detail.

The disclosure is therefore not limited to the embodiments described above, but is limited solely by the scope of protection of the attached claims.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The invention claimed is:

1. A device to simultaneously manage plural electronic facilities provided in one or more buildings, comprising:
   plural interface elements to simultaneously connect the device to the plural electronic facilities, respectively each of the plural electronic facilities operating according to a set of operating parameters;
   a connection element to connect the device to a portable storage device; and
   a control unit to:
   configure the portable storage device by creating and saving an installer file to the portable storage device, the installer file including an installer code (I-code) and a system code (S-code) used to recognize the portable storage device as being a configured portable storage device by other control units of other devices managing the plural electronic facilities;
   configure the portable storage device with a unique identifier and operating parameters of one or more electronic facilities;
   determine the portable storage device is authorized to operate the device based on recognizing the unique identifier stored in the portable storage device;
   read one or more files from the portable storage device to obtain at least one personalized operating parameter setting set for a user who is assigned possession of the portable storage device;
   temporarily control operation of at least one electronic facility of the plural electronic facilities via a respective interface element of the plural interface elements, by temporarily setting at least one operating parameter of the set of operating parameters to the at least one personalized operating parameter setting dictated by the one or more files read, while the portable storage device is connected to the connection element;
   write one or more generated files to the portable storage device based on a signal indicating a type of electronic facility of a building of the plural electronic facilities.

2. The device according to claim 1, wherein the control unit is programmed to simultaneously manage two or more electronic facilities.

3. The device of claim 1, wherein the reading of the one or more first files from the portable storage device is based on cryptography techniques, wherein the writing of the one or more generated files to the portable storage device is based on cryptography techniques.

4. The device according to claim 1, wherein the control unit operates to generate the one or more generated files based on the result of the reading of the one or more files from the portable storage device.

5. The device according to claim 1, wherein one or more properties of the one or more generated files written to the portable storage device depend on a kind of the plural electronic facilities connected to the device via the plural interface elements.

6. The device according to claim 1, wherein the control unit is programmed to delete at least one file from the portable storage device in response to one or more predetermined condition.

7. The device according to claim 1, wherein the connection element comprises a USB (Universal Serial Bus) receptacle.

8. The device according to claim 1, wherein the plural electronic facilities comprise one or more of the following facilities: an intrusion system, an access control system, a home automation system, a climate control system, and an illumination control system.

9. The device according to claim 1, wherein each of the plural of interface elements to connect the device to one of the plural of electronic facilities such that the device can simultaneously manage different electronic facilities.

10. The device according to claim 3, wherein the cryptography techniques comprise a RSA (Rivest, Shamir, Adleman) technique.

11. The device of claim 1, wherein the control unit is configured to recognize the portable storage device during the reading of the one or more files based on the at least one of the one or more files written to the portable storage device.

12. The device of claim 11, wherein the at least one file comprises a system code (S-code).

13. The device according to claim 1, wherein the one or more read files includes a unique identifier to identify and authorize the user as an authorized user to at least one electronic facility of the plural electronic facilities, and at least one specific parameter configuration including plural personalized parameter settings preferred by the user for a subject electronic facility of the plural electronic facilities, and wherein the control unit is further to:
  utilize the unique identifier to determine whether the user is authorized to temporarily control the subject electronic facility; and
  use the plural personalized parameter settings of the specific parameter configuration to temporarily set the operating parameters of the subject electronic facility, where it is determined that the user is authorized to temporarily control the subject electronic facility.

14. The device according to claim 13, wherein the one or more read files includes one or more period of validity of the unique identifier, and wherein the control unit is to:
  further consider the one or more period of validity to determine whether the user is authorized to temporarily control the subject electronic facility during a current period.

15. A method to set up a device for managing one or more plural electronic facilities provided in one or more buildings, comprising:
  creating an installer portable storage device to which an installer file is saved, the installer file comprising an installer code (I-code) and a system code (S-code) associated with the installer code (I-code), the installer code (I-code) and the system code (S-code) used to recognize the installer portable storage device as being a configured portable storage device by other devices managing the plural electronic facilities;
  reading of the installer portable storage device via the device to save the installer file in a memory of the device;
  authorizing, via the device using the installer file, at least one portable storage device comprising the system code (S-code) to operate the device;
  reading by a control unit of the device having plural interface elements to simultaneously connect the device to the plural electronic facilities, one or more files from the at least one portable storage device to obtain at least one personalized operating parameter setting set for a user who is assigned possession of the at least one portable storage device; and
  temporarily controlling, by the control unit, ongoing operation of at least one electronic facility of the plural electronic facilities via a respective interface element of the plural interface elements, by temporarily setting at least one operating parameter of the at least one electronic facility to the at least one personalized operating parameter setting dictated by the one or more files read, while the at least one portable storage device is connected to the device;
  writing one or more generated files to the at least one portable storage device based on a signal indicating a type of electronic facility of a building of the plural electronic facilities.

16. The method according to claim 15, further comprising:
  creating an updated installer portable storage device, the updated installer portable storage device comprising an updated installer file, the updated installer file comprising the installer code (I-code), the system code (S-code), and a further updated installer code (I-code') to associate the system code (S-code) to the further updated installer code (I-code').

17. The method according to claim 15, further comprising:
  creating an updated installer portable storage device, the updated installer portable storage device comprising an updated installer file, the updated installer file comprising the installer code (I-code), the system code (S-code), a further updated installer code (I-code"), and a further updated system code (S-code"), the further updated system code (S-code") being associated with the further updated installer code (I-code").

* * * * *